United States Patent Office 3,438,091
Patented Apr. 15, 1969

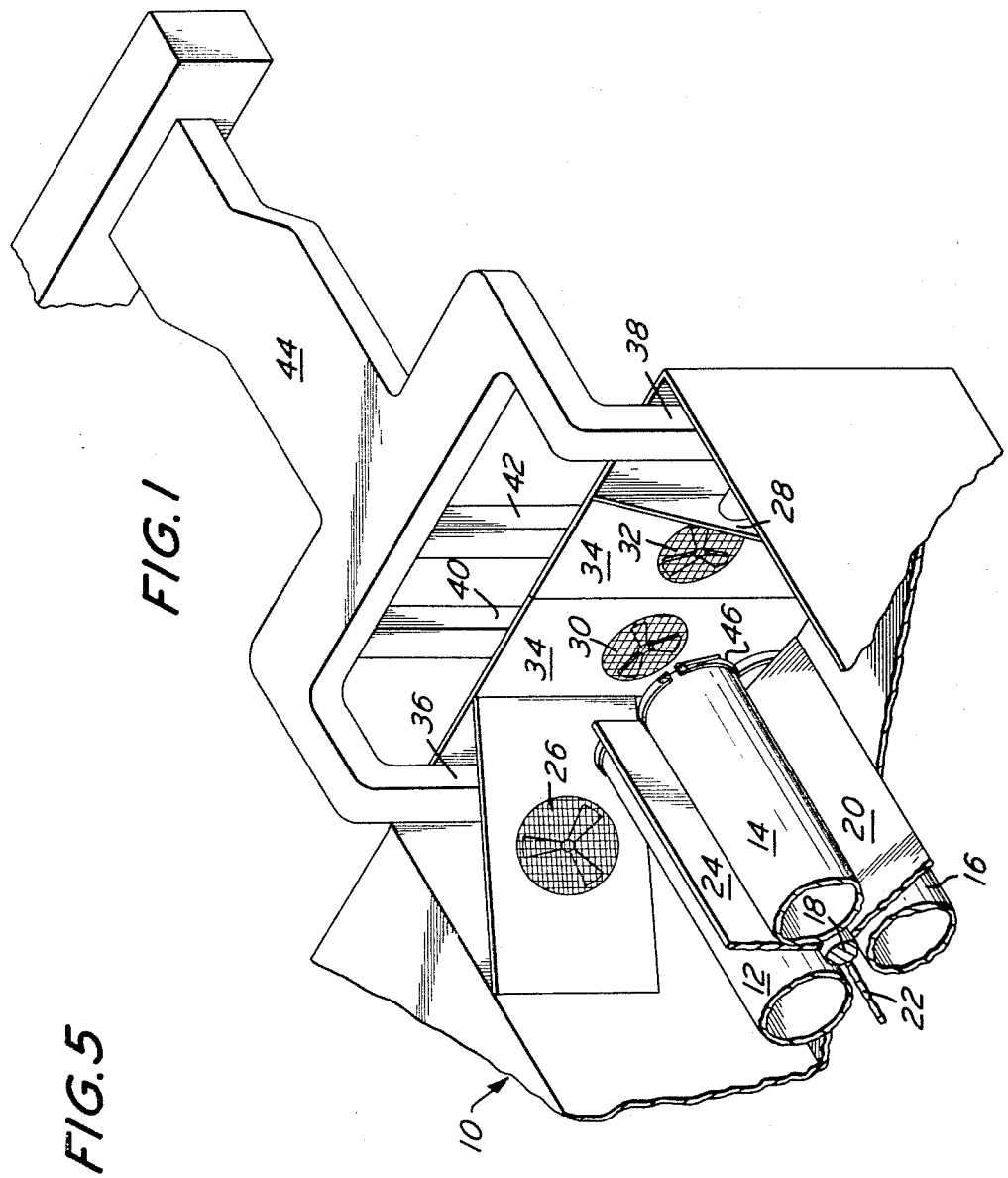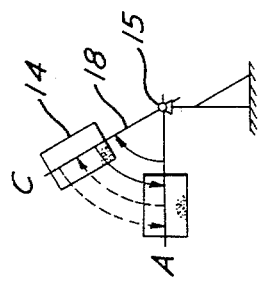
INVENTOR
REESE SAVAGE
BY Seidel & Gonda
ATTORNEYS.

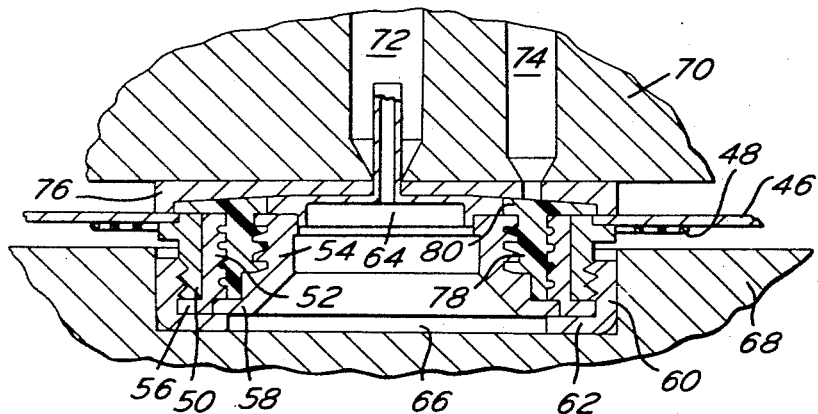
FIG.2
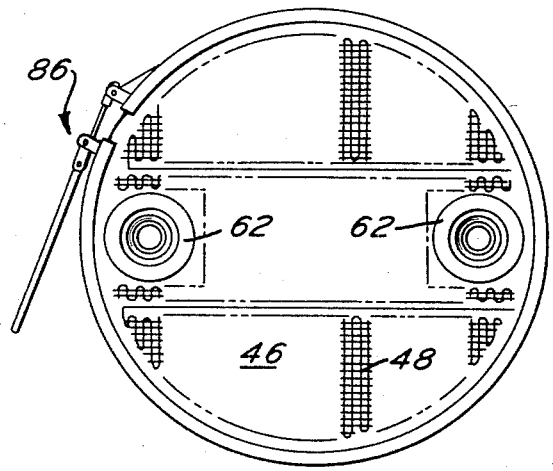
FIG.3
FIG.4
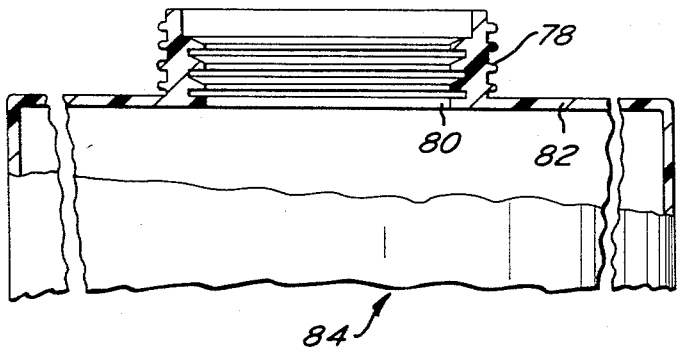
INVENTOR
REESE SAVAGE
BY Seidel & Gonda
ATTORNEYS.

3,438,091
APPARATUS FOR MOLDING THERMOPLASTIC
CONTAINERS
Reese Savage, Newark, Del., assignor to Container Corporation of America, Chicago, Ill., a corporation of Delaware
Filed Nov. 17, 1965, Ser. No. 508,251
Int. Cl. B29f 1/06; B29c 1/06
U.S. Cl. 18—42     7 Claims

ABSTRACT OF THE DISCLOSURE

Apparatus is disclosed for preforming a component such as the threaded boss on the container. The component is preformed by molding the same on the cover for the mold in which the container is formed. Thereafter, the cover, with the preformed component thereon, is attached to the container mold. The container is molded in a manner so that the preformed component becomes an integral part thereof.

---

This invention relates to apparatus for molding thermoplastic containers. More particularly, the present invention relates to apparatus for injection molding a portion of a container and then using said portion as a preformed insert in connection with completion of the molding operation of the container.

Reference is made to a copending application entitled Method of Gyratory Molding of Hollow Thermoplastic Articles filed on Nov. 17, 1965, Ser. No. 508,250 by Robert J. Pfeifenroth, and now abandoned, the disclosure of which is incorporated herein by reference. In said application, there is disclosed a gyratory molding apparatus wherein preformed components of a container are formed by hand on a semi-automatic basis in a mold. An integral part of the present invention resides in apparatus for injection molding the preformed components with the mold forms being supported by the cover for the gyratory mold.

In accordance with the present invention, one or more threaded bosses for a container such as a barrel are injection molded into a mold cavity supported by the cover for a gyratory mold. Before the thus-molded components have solidified and hardened, the cover is applied to the open end of a gyratory mold wherein thermoplastic molding powder has been deposited so that the container may be formed with the preformed boss being an integral part of the top wall of the container.

I have found that by injection molding the bosses, better control of the threads as well as homogeneity of the material can be obtained while eliminating malformed flanges, producing the bosses cheaper. The bosses may be produced cheaper due to the fact that they can be injection molded in about ten seconds as compared with about ten minutes which is required for the process disclosed in the above-mentioned copending application. In addition, the process in the above-identified application requires that the bosses be molded by using powdered thermoplastic molding material which is more expensive than the pellets for the same material as used in the injection molding process.

It is an object of the present invention to provide apparatus for producing containers having one or more bosses integral with a top wall thereof.

It is another object of the present invention to provide apparatus for producing containers having an integral boss on one wall thereof in a manner which is faster, cheaper, provides better control on threads, and provides greater homogeneity of the material.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial perspective view of a gyratory molding apparatus.

FIGURE 2 is a sectional view through a portion of a cover for the gyratory mold juxtaposed to the discharge head on an injection molding machine.

FIGURE 3 is an end view of one of gyratory molds in FIGURE 1.

FIGURE 4 is a partial sectional view of a container having an integral boss on a top wall thereof.

FIGURE 5 is a diagrammatic illustration of the molding apparatus.

Referring to the drawing in detail, wherein like numerals indicate like elements, there is shown in FIGURE 1 a gyratory molding apparatus designated as 10 and corresponding to the apparatus disclosed in the above-mentioned copending application.

The apparatus 10 includes one or more molds such as molds 12, 14 and 16 supported by a shaft 18. A heat barrier is positioned between each of the molds and supported by shaft 18. Thus, heat barriers 20, 22 and 24 are provided as illustrated in FIGURE 1. The shaft 18 is adapted to be moved from a position A (see FIGURE 5) which is slightly below the horizontal to a position C which is slightly above the horizontal, thereby oscillating about a horizontal shaft 15. At the same time, a motor, not shown, is provided to rotate shaft 18 about its longitudinal axis and thereby simultaneously rotate the molds 12, 14 and 16 about the longitudinal axis of shaft 18.

As disclosed in the above-mentioned application, fans 26 and 28 are provided in addition to fans 30 and 32 to blow precooled air onto the molds during the cooling stage. Fans 30 and 32 are supported by gates 34.

Precooled air is delivered to the fan 26 by way of conduit 36. Precooled air is delivered to the fan 28 by way of conduit 38. Conduits 40 and 42 are provided to deliver precooled air to the fans 30 and 32, respectively. Each of the conduits 36–42 are connected to a manifold 44 which in turn is connected to an air conditioner.

A cover for each of the molds 12, 14 and 16 is provided. Each cover is identical. Hence, only one such cover will be discussed in detail hereinafter.

Cover 46 for mold 14 is provided with heating elements 48 on its outer surface. Heating elements, not shown, are provided on each of the molds on their outer surface. The cover 46 is provided with one or more holes therein for receiving mold cores. As will be apparent from FIGURE 3, two such openings are provided. The mold cores in each of the openings in the cover 46 are identical. Hence, only one such unit is illustrated in detail in FIGURE 2.

A ring 50 is fixedly secured in an opening in the cover 46. An outer ring-shaped mold 52 is provided within the ring 50. An inner core 54 is provided within the ring-shaped mold 52. Outer ring-shaped mold 52 has a radially outwardly directed flange 56 which overlies an end surface on the ring 50. Core 54 has a radially outwardly directed flange 58 overlying a portion of the end surface of ring-shaped mold 52. A sleeve 60 is threadedly secured to the ring 50 and has a radially inwardly directed flange 62 which overlies the flanges 56 and 58 to thereby retain the elements in assembled relationship.

A vent core 64 is provided within core 54. Core 64 is hollow and at its upper end is provided with a vent opening. When a thermoplastic resin is being injection molded into the cavity, the mold 52, core 54, and the sleeves 60 are received within a recess 66 on the upper surface of a support member 68 below the head 70 on an injection molding machine.

Head 70 is provided with a vent passage 72 which receives the vent core 64. Head 70 is also provided with an injection nozzle 74 through which the preplasticized molding material will be delivered. On its lower surface, the head 70 is provided with a molding ring 76. With the cover 46 and its associated mold parts supported as illustrated in FIGURE 2, relative movement may be provided between head 70 and member 68. Preferably, member 68 is mounted for movement toward and away from head 70. When member 68 is moved upwardly to the position illustrated in FIGURE 2, the molding ring 76 contacts the inner surface on the cover 46 and the upper surface on the vent core 64. Preplasticized molding material is injected into the cavity between the mold 52 and core 54 under pressure and also enters the cavity thereabove to provide a boss 78 having an integral flange 80. Flange 80 will lie in a substantially horizontal plane above the plane of the upper surface of cover 46.

In order to take advantage of the temperature of the boss 78 and flange 80, they are preferably not permitted to harden. As soon as possible after injection molding the boss 78 and flange 80, the cover 46 is transported to the location where the gyratory molds 12, 14 and 16 are located. A cover 46 will be applied to the open end of each mold by means of a clamping device designated generally as 86. Powdered thermoplastic molding material will have previously been introduced into the molds. During the molding operation, the flange 80 will become an integral part of the top wall 82 on a container such as a barrel 84.

It will be noted that the boss 78 is provided with buttress threads on its inner periphery and a standard screw thread on its outer periphery. In this manner, the boss 78 may receive a plug assembly as illustrated in Patent 2,962,185 and having buttress threads on its outer periphery. An internally threaded cap will be provided for co-operation with the conventional threads on the outer periphery of the boss 78. As indicated above, the top wall 82 of the container 84 will have at least one such boss 78 integral therewith. It will be obvious to those skilled in the art that the container 84 may be in the form of a liner for a metal container. The boss 78 is preferably injection molded from low density polyethylene which will be the same material from which the remainder of the container will be molded.

Hereinafter, the cover 46 may be referred to as a mold member. The cavity between the core 54 and mold 52 may be referred to as a first annular cavity. The cavity for the flange 80 may be referred to as a second annular cavity contiguous with the first cavity. The preformed injection molded boss 78 and its flange 80 may be referred to as an injection molded component.

When the boss 78 and flange 80 are injection molded as described above, their temperature will be approximately 350° F. Heat transfer into polyethylene is notoriously slow. In order not to permit this preformed component to cool down and then have to be reheated, the cover 46 is coupled to its mold 14 within about three minutes. Between three and five minutes of being injection molded, the flange 80 drops 25° F. in temperature to about 325° F. If flange 80 is permitted to drop in temperature to 325° F. and the mold 14, to which cover 46 is applied, is heated to 350° F., flange 80 will not blend with cover 82 into a homogeneous wall but rather may have a demarcation line and result in the container 84 being a leaker. Hence, coordination between the molding operations in FIGURE 1 with that of FIGURE 2 is required or some heating chamber be provided to prevent flange 80 from cooling until it is ready for use.

The present invention may be embodied in other specific forms without departing from the spirit or essential attributes thereof and, accordingly, reference should be made to the appended claims, rather than to the foregoing specification as indicating the scope of the invention.

I claim:

1. In a molding apparatus comprising a mold member, means for preforming on said member a component of an element to be molded, said means including an inner core and a surrounding ring-shaped mold, said core and mold being supported by said member in spaced relation to define an annular cavity therebetween, an injection molding head having a surface cooperating with said member to partially define a second annular cavity contiguous with said first-mentioned cavity, said second cavity having a greater outer diameter than said first-mentioned cavity, and said head having a passage communicating with said cavity for introducing molding material into the cavities under pressure, whereby an injection molded component may be preformed on the member before the member is applied to a mold wherein the component will become integral with a part to be formed in the mold.

2. A molding apparatus in accordance with claim 1 wherein said mold member is a cover for one end of a mold within which a hollow container is to be molded.

3. In molding apparatus in accordance with claim 1 including a vented core supported by said member and projecting into a vent passage in said head.

4. In apparatus in accordance with claim 1 wherein said molding head surface is ring-shaped and of a diameter greater than the outer diameter of said ring mold, said head passage communicating directly with said second cavity in line with said first cavity.

5. In molding apparatus in accordance with claim 1 wherein said inner core is provided with buttress threads on its outer periphery so that the inner periphery of the portion of the component formed in said first cavity is provided with buttress threads on its inner periphery.

6. An apparatus in accordance with claim 5 wherein said first cavity is a boss cavity of generally cylindrical configuration, said second cavity being a flange cavity of generally flat configuration extending in a direction substantially perpendicular to the direction of the first cavity, with said second cavity extending radially inwardly and radially outwardly with respect to said first cavity.

7. In molding apparatus in accordance with claim 1 including a support member for supporting said mold member and core below said head, one of said support member and head being mounted for relative movement with respect to the other.

References Cited

UNITED STATES PATENTS

| | | | |
|---|---|---|---|
| 2,277,599 | 3/1942 | McGinnis | 18—42 |
| 2,812,548 | 11/1957 | Quinche et al. | 18—42 |
| 3,086,245 | 4/1963 | Gits | 18—42 X |
| 3,259,682 | 7/1966 | Neville et al. | 18—42 X |
| 3,330,006 | 7/1967 | Jenkins | 18—42 |

WILBUR L. McBAY, *Primary Examiner.*

U.S. Cl. X.R.

249—59